United States Patent
Wei

(10) Patent No.: US 7,247,591 B2
(45) Date of Patent: Jul. 24, 2007

(54) TRANSLUCENT PCA CERAMIC, CERAMIC DISCHARGE VESSEL, AND METHOD OF MAKING

(75) Inventor: George C. Wei, Weston, MA (US)

(73) Assignee: Osram Sylvania Inc., Danvers, MA (US)

(*) Notice: Subject to any disclaimer, the term of this patent is extended or adjusted under 35 U.S.C. 154(b) by 82 days.

(21) Appl. No.: 10/908,795

(22) Filed: May 26, 2005

(65) Prior Publication Data

US 2005/0184636 A1    Aug. 25, 2005

(51) Int. Cl.
*C04B 35/115* (2006.01)
*C04B 35/58* (2006.01)
*H01J 17/16* (2006.01)

(52) U.S. Cl. .............. 501/153; 501/96.1; 501/98.4; 313/636

(58) Field of Classification Search ............. 501/153, 501/96.1, 98.4; 313/480, 493, 636
See application file for complete search history.

(56) References Cited

U.S. PATENT DOCUMENTS

| | | | | |
|---|---|---|---|---|
| 3,026,210 | A | 3/1962 | Coble | 106/39 |
| 3,792,142 | A | 2/1974 | Kobayashi | 264/65 |
| 4,031,177 | A | 6/1977 | Auriol et al. | 264/65 |
| 4,543,346 | A * | 9/1985 | Matsui et al. | 501/120 |
| 4,762,655 | A | 8/1988 | Rhodes et al. | 264/65 |
| 4,797,238 | A | 1/1989 | Rhodes et al. | 264/65 |
| 4,948,538 | A | 8/1990 | Wei et al. | 264/6 |
| 5,936,351 | A | 8/1999 | Lang | 313/634 |
| 6,399,528 | B1 | 6/2002 | Krell et al. | 501/80 |

FOREIGN PATENT DOCUMENTS

| | | |
|---|---|---|
| EP | 0587238 | 7/2000 |
| EP | 1053983 | 11/2000 |
| EP | 0650184 | 6/2002 |
| WO | WO 2004/007397 | 1/2004 |

OTHER PUBLICATIONS

R. Coble, Effect of Atmosphere on Sintering Alumina to Theoretical Density, *J. Am. Ceram. Soc.*, 45(3) (1962) 123-7.
G. Wei et al., Sintering of Translucent Alumina in a Nitrogen-Hydrogen Gas Atmosphere, *J. Am. Ceram. Soc.*, 83(7) 1641-48 (2000).
G. Wei, Outgassing Behavior of Carbon-Bonded Carbon-Fiber Thermal Insulation, *Proc. Carbon Conf.* (1979) 249-250.
H. Willems et al., Thermodynamics of Alon I: Stability at Lower Temperatures, *J. Eur. Ceram. Soc.*, 10 (1992) 327-337.
H. Willems et al., Thermodynamics of Alon II: Phase Relations, *J. Eur. Ceram. Soc.*, 10 (1992) 339-346.
I. Overholser et al., Overholser et al., The Degassing Behavior of commercial Graphites, *Proceedings of Conf. on Carbon, Fifth Carbon Conference* (1961) 194-204.

* cited by examiner

*Primary Examiner*—Karl Group
(74) *Attorney, Agent, or Firm*—Robert F. Clark

(57) ABSTRACT

A translucent polycrystalline material suitable for use in ceramic discharge vessels for metal halide lamps is produced by sintering an alumina powder doped with a MgO sintering aid in a nitrogen atmosphere containing a partial pressure of a vapor phase carbon-containing species. The sintered polycrystalline alumina has a grain boundary phase containing aluminum, oxygen and nitrogen. The formation of the AL—O—N grain boundary phase is believed to facilitate the transport of nitrogen from entrapped pores during sintering. Preferably, the PCA is sintered in a carbon-element furnace under flowing ultra-high-purity nitrogen.

7 Claims, 3 Drawing Sheets

TRANSLUCENT PCA CERAMIC, CERAMIC DISCHARGE VESSEL, AND METHOD OF MAKING

BACKGROUND OF THE INVENTION

Translucent polycrystalline alumina (PCA) ceramic has made possible present-day high-pressure sodium (HPS) and ceramic metal halide lamps. The arc discharge vessels in these applications must be capable of withstanding the high temperatures and pressures generated in an operating lamp as well be resistant to chemical attack by the fill materials.

In HPS lamps, the discharge vessels are tubular as shown in FIG. 2, whereas for ceramic metal halide lamps discharge vessels can range from a cylindrical shape to an approximately spherical shape (bulgy). Examples of these types of arc discharge vessels are given in European Patent Application No. 0 587 238 A1 and U.S. Pat. No. 5,936,351, respectively. A bulgy-shaped discharge vessel is shown in FIG. 1. The bulgy shape with its hemispherical ends yields a more uniform temperature distribution, resulting in reduced corrosion of the PCA by the lamp fills.

In the past, some of the key elements in sintering polycrystalline alumina (PCA) to translucency involved the use of (1) a high-purity powder, (2) a small concentration of a MgO sintering aid, and (3) sintering in an $H_2$-containing atmosphere. It has been reported in the literature that air, $N_2$, He, and Ar atmospheres may not be used, but $H_2$, $O_2$, or vacuum did permit the attainment of translucency. This was due to the solubility of the gases in the lattice and grain boundaries allowing entrapped gaseous species to diffuse to the surface. In a vacuum environment, or in a gaseous atmosphere that is soluble and diffused rapidly in PCA, the sintering process is not kinetically limited, and pore-free microstructures are achieved. Later work has indicated that translucent alumina may be sintered in dissociated ammonia (25% $N_2$-75% $H_2$) and even in a CO atmosphere. The sintering of alumina has been reported in $N_2$—$H_2$ atmospheres containing as low as 2% hydrogen. Because of cost and safety issues, it would be desirable to eliminate the need to add hydrogen gas and use nitrogen gas only. However, a $N_2$ atmosphere alone has not been able to produce translucent PCA

SUMMARY OF THE INVENTION

It has been discovered that polycrystalline alumina can be sintered to translucency in a nitrogen gas atmosphere in a carbon-element furnace. As used herein, translucency means a total transmittance of at least 92% in the visible wavelength region from about 400 nm to about 700 nm. Preferably, the total transmittance of the discharge vessel according to this invention is at least 95%.

The sintering results in the carbon-element furnace are drastically different from those using the W-element, Mo-shield or alumina tube muffle furnace. Microstructural analysis of the PCA sintered in $N_2$ in a carbon-element furnace indicates the formation of a grain-boundary AL—O—N phase which is believed to facilitate the transport of nitrogen from the entrapped pores. The formation of the grain-boundary AL—O—N phase is believed to result from the combination of the nitrogen atmosphere and vapor phase carbon-containing species, in particular, C, CO and $CO_2$, emanating from the carbon furnace components. For example, the formation of aluminum oxynitride (either $Al_7O_9N$ or $Al_{23}O_{27}N_5$) may proceed by the following reaction:

$7/2Al_2O_3 + 3/2C + \frac{1}{2}N_2 \rightarrow Al_7O_9N + 3/2CO$

The partial pressure of carbon at aluminum oxide sintering temperatures is estimated to be about $10^9$ atm. Preferably, the furnace atmosphere should contain from about $1\times10^{-12}$ atm to about $1\times10^{-7}$ atm of carbon. The furnace atmosphere may also contain partial pressures of CO, $CO_2$, $H_2$, $CH_4$ and $C_2H_2$. In particular, the partial pressures of these gases during sintering is estimated as: $10^{-3}$ to $10^{-4}$ $P_{CO}$; $10^{-6}$ to $10^{-7}$ atm $P_{CO2}$; $10^{-3}$ atm $P_{H2}$, $10^{-10}$ atm $P_{CH4}$ and $10^{-7}$ atm $P_{C2H2}$. Although it is preferred to sinter the PCA in a carbon-element furnace, a similar sintering atmosphere may be generated by other means, e.g., using graphite trays or placing other sources of carbon in other types of furnaces. However, the atmosphere may be more difficult to control in furnaces that contain W and Mo components because these metals readily getter carbon.

It should be noted that the partial pressure of hydrogen expected from outgassing of the carbon furnace components, $10^{-3}$ atm, is more than an order of magnitude less than the partial pressure of hydrogen previously known to be required for sintering aluminum oxide to translucency in a nitrogen-hydrogen mixed gas atmosphere. Preferably, the PCA discharge vessel is sintered in a nitrogen atmosphere containing less than about 0.2% $H_2$ by volume. More preferably, the furnace atmosphere contains about $1\times10^{-9}$ atm of carbon and about $1\times10^{-3}$ to about $1\times10^{-4}$ atm CO.

A relatively pure nitrogen gas source is used to create the furnace atmosphere. Preferably, the nitrogen gas source should contain no more than about 0.005% by volume total impurities. More preferably, the nitrogen gas is an ultra-high-purity grade that is 99.999% nitrogen by volume. The sintering temperature may be in the range from about 1800° C. to about 2000° C. and sintering times may range from about 1 hour to about 70 hours. More preferably, the discharge vessels are sintered at from at about 1850° C. to about 1950° C. for about 4 to about 50 hours, and most preferably, at about 1900° C. for about 10 hours.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
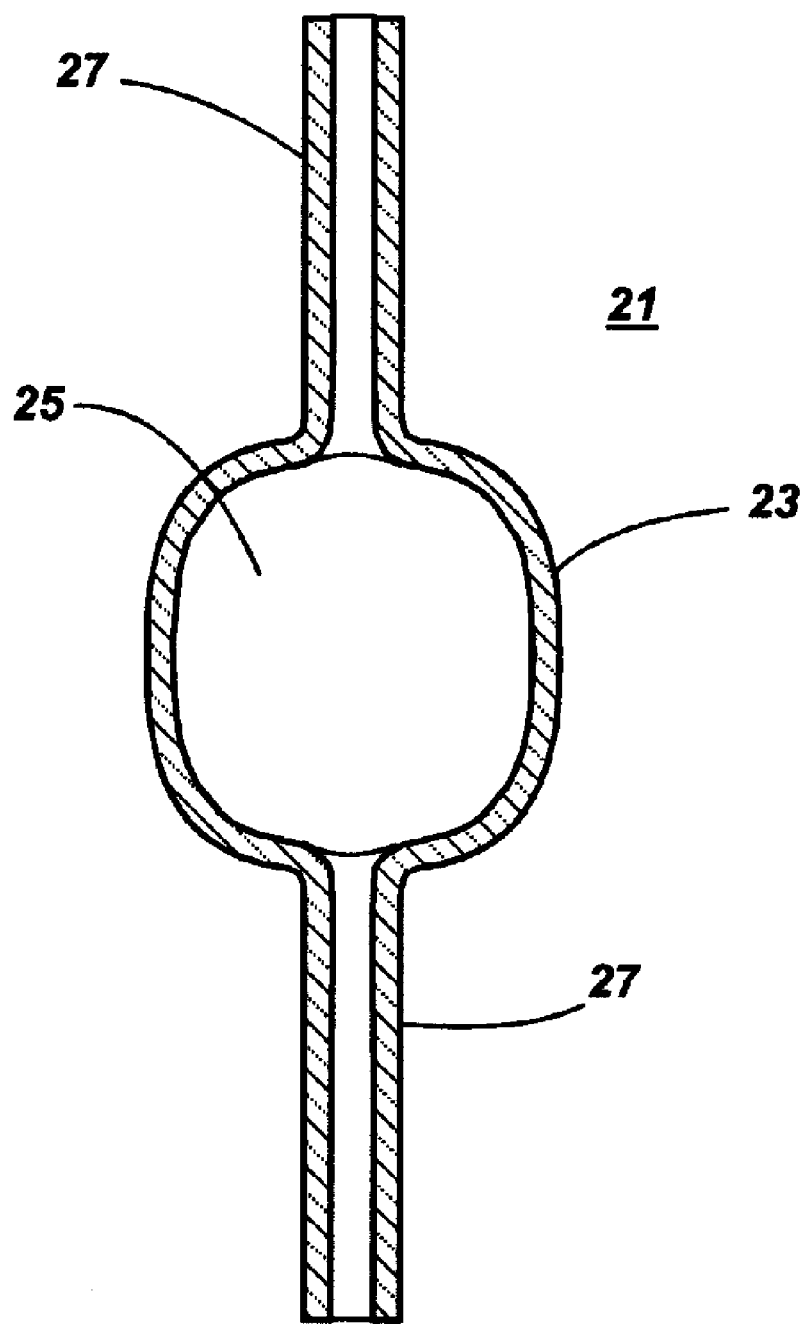
FIG. 1 is a cross-sectional illustration of a prior art bulgy-shaped discharge vessel.

FIG. 1 is a cross-sectional illustration of a conventional bulgy-shaped arc discharge vessel. The arc discharge vessel 21 has a ceramic body 23 which is comprised of polycrystalline alumina. The body 23 defines an arc discharge cavity 25 and has two capillaries 27 extending outwardly in opposite directions from the discharge cavity 25. A typical thickness of the discharge cavity wall is about 0.8 mm. The capillaries are suitable for receiving, and sealing therein, electrode assemblies (not shown) which provide a conductive path for supplying electric power to the discharge vessel in order to strike and sustain an arc within the discharge cavity.

Figure 2:
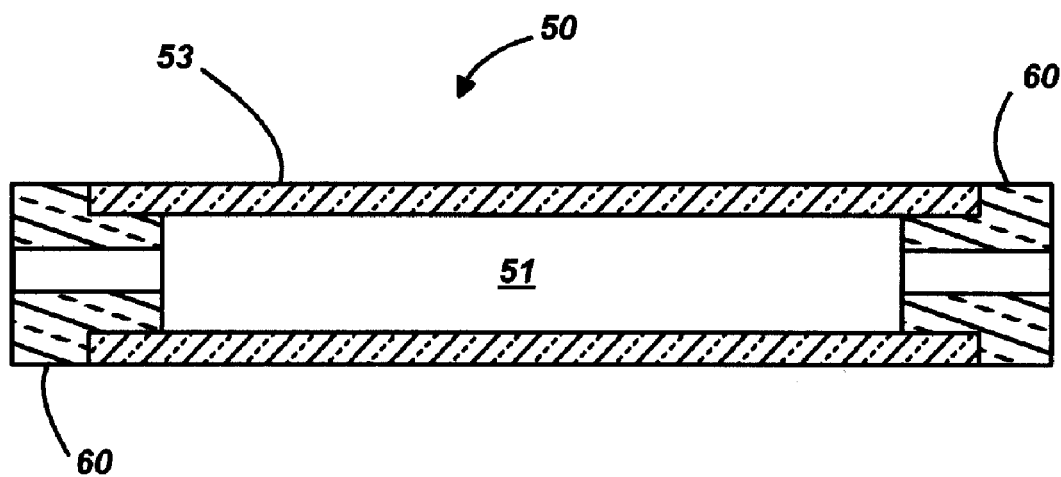
FIG. 2 is a cross-sectional illustration of a prior art HPS discharge vessel.

FIG. 2 is a cross-sectional illustration of a conventional discharge vessel for HPS lamps. The discharge vessel 50 has a tubular body 53 comprised of PCA. Annular plugs 60 comprised of PCA are sealed in each end of the tubular body 53 thereby defining discharge chamber 51. The aperture in the annular plugs is for receiving an electrode assembly which typically consists of a niobium feedthrough to which a tungsten electrode is attached. The niobium feedthrough is frit sealed in the aperture after a sodium/mercury amalgam and a buffer gas has been added to discharge chamber 51.

Ceramic discharge vessels formed from a high-purity, finely divided aluminum oxide (alumina) powder may be consolidated by isopressing, extrusion, slip casting, gel casting, or injection molding. The MgO dopant is generally added to the alumina powder prior to consolidation. The details of various methods of manufacturing green ceramic bodies for discharge vessels are described in, for example, European Patent No. 0 650 184 B1 (slip casting), U.S. Pat. No. 6,399,528 (gel casting), International Patent Application No. WO2004/007397 A1 (slip casting) and European Patent Application No. EP 1 053 983 A2 (isopressing).

The sintering method of this invention produces a translucent PCA ceramic that has a second nitrogen-containing phase at grain boundaries. The phase comprises aluminum, oxygen and nitrogen and is believed to be an aluminum oyxnitride. This second phase is believed to facilitate the diffusion of nitrogen out of the entrapped pores making it possible to sinter the PCA to translucency in a $N_2$ atmosphere without having to add at least 2% hydrogen. The sintering method and the resulting translucent PCA are described in more detail in the following examples. However, it should be understood that the present invention is by no means restricted to such specific examples.

EXAMPLES

A high purity (99.97% pure) $Al_2O_3$ powder is preferably used as the starting powder to form the polycrystalline alumina discharge vessel. Forming methods may include isopressing, extrusion, injection molding, gel casting and slip casting. For straight tubes, isopressing or extrusion is preferred. For more complex shapes, injection molding, gel casting or slip casting may be used. Preferred alumina powders are CR30F and CR6 manufactured by Baikowski. CR30F contains ~80% alpha-$Al_2O_3$ and ~20% gamma-$Al_2O_3$, while CR6 is 100% alpha-$Al_2O_3$. The crystallite sizes are about 0.05 micrometers with a mean specific surface area of 30 $m^2$/g for CR30F and 6 $m^2$/g for CR6. The reported average particle size is about 0.5 micrometers for both types. Sintering aides such as MgO, $Y_2O_3$ and $ZrO_2$ are preferred. MgO is required to sinter the PCA to translucency. Preferably, the amount of MgO is from about 100 ppm to about 1000 ppm. The alumina powders may be doped with the sintering aids by mixing the alumina powder in aqueous solutions of the precursors of the sintering aids. In order to form the green shape, the powders are combined with an appropriate binder material such as polyvinyl alcohol, polyethylene glycol, methylcellulose, or a wax. Prefiring of the shapes is conducted at 850-1350° C. in air for 1-4 h to remove the binders. Discharge vessels of varying sizes (wattages) and their capillaries were made.

Sintering was accomplished in a carbon-element furnace (Centorr Company, Model M10) under one atmosphere of flowing ultra-high-purity (UHP) grade (99.999%) nitrogen gas. More preferably, the UHP-grade nitrogen gas contains <1 ppm CO or $CO_2$, <2 ppm $O_2$, <3 ppm $H_2O$ and <0.5 ppm total hydrocarbons. The furnace was a horizontal furnace containing graphite elements and carbon fiber insulation. Prefired PCA parts are placed in an alumina boat with or without setter powder. Two types of setter powders are used: aluminum oxynitride and alumina. The gas flow rate in the furnace corresponded to a linear gas speed of about 0.02 m/s. The sintering temperatures (~1800-1920° C.) are reached by heating at a rate of about 8-16° C./min. The hold time at the sintering temperature is 4-40 h.

An aluminum oxynitride setter powder bed is preferred to create a partial pressure of aluminum oxynitride so that the grain-boundary aluminum oxynitride phase is retained, which then facilitates diffusion of nitrogen trapped inside pores. PCA parts embedded in the powder bed sintered to significantly higher transmittance than those not buried in the bed. The aluminum oxynitride powder bed may be accomplished by using (1) aluminum oxynitride powder, (2) alumina powder that would gradually form an aluminum oxynitride phase in flowing nitrogen in a carbon furnace, or (3) a mixture of aluminum nitride and alumina powder which would then react to form aluminum oxynitride in the carbon furnace.

The total transmittance of the sintered part involved placing a miniature incandescent lamp or a fiber-optical source inside the sintered part and measuring the total amount of diffuse light transmitted and integrated over a sphere. The wavelength range for the measurement was from about 400 nm to about 700 nm. The following table provides the total transmittance of various PCA parts that were sintered in flowing $N_2$ in a carbon-element, carbon-fiber insulation furnace.

| No. | Sample | Sintering Aid | Sintering Cycle | Total Transmittance |
|---|---|---|---|---|
| 1 | 150 W capillary tube | 200 ppm MgO | 1900° C. - 4 hours | 93.0% |
|   |   | 400 ppm $ZrO_2$ | 1890° C. - 4 hours |   |
|   |   | 20 ppm $Y_2O_3$ | 1900° C. - 6 hours |   |
| 2 | 150 W capillary tube | 200 ppm MgO | 1900° C. - 4 hours | 94.5% |
|   |   | 400 ppm $ZrO_2$ | 1890° C. - 4 hours |   |
|   |   | 20 ppm $Y_2O_3$ | 1900° C. - 18 hours |   |
| 3 | 150 W bulgy | 200 ppm MgO | 1900° C. - 4 hours | 96.7% |
|   |   | 400 ppm $ZrO_2$ | 1900° C. - 48 hours |   |
|   |   | 20 ppm $Y_2O_3$ |   |   |
| 4 | 150 capillary tube | 200 ppm MgO | 1900° C. - 4 hours | 98.0% |
|   |   | 400 ppm $ZrO_2$ | 1890° C. - 40 hours |   |
|   |   | 20 ppm $Y_2O_3$ |   |   |

-continued

| No. | Sample | Sintering Aid | Sintering Cycle | Total Transmittance |
|---|---|---|---|---|
| 5 | 400 W capillary tube | 500 ppm MgO | 1910° C. - 40 hours<br>1920° C. - 10 hours | 93.0% |
| 6 | 250 W HPS tube | 200 ppm MgO<br>400 ppm $ZrO_2$<br>20 ppm $Y_2O_3$ | 1910° C. - 40 hours<br>1920° C. - 10 hours | 93.0% |
| 7 | 35 W bulgy | 500 ppm MgO | 1910° C. - 40 hours<br>1920° C. - 30 hours | 92.0% |
| 8 | 70 W HPS tube | 500 ppm MgO<br>350 ppm $Y_2O_3$ | 1920° C. - 10 hours<br>($Al_7O_9N$ setter powder) | 94.0% |
| 9 | 70 W HPS tube | 500 ppm MgO<br>350 ppm $Y_2O_3$ | 1920° C. - 10 hours<br>($Al_2O_3$ setter powder) | 92.0% |

The microstructures of the PCA sintered according to the method of this invention were examined by optical microscopy and scanning electron microscopy (SEM) with energy dispersive x-ray analysis (EDXA). The morphology of the grains on the as-sintered surface is highly etched with cleavage steps, making it difficult to measure the grain size. SEM/EDXA of the surface showed the presence of nitrogen in PCA, indicating the formation of aluminum oxynitride on the surface.

Figure 3:
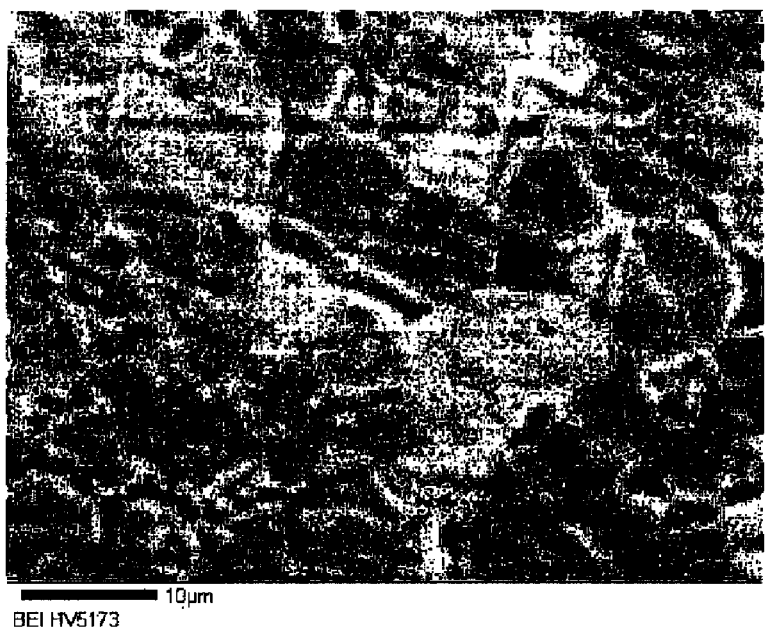
FIG. 3 is a back-scattered electron image of a polished cross section of a PCA tube sintered under $N_2$ in a carbon-element furnace.
Figure 4:
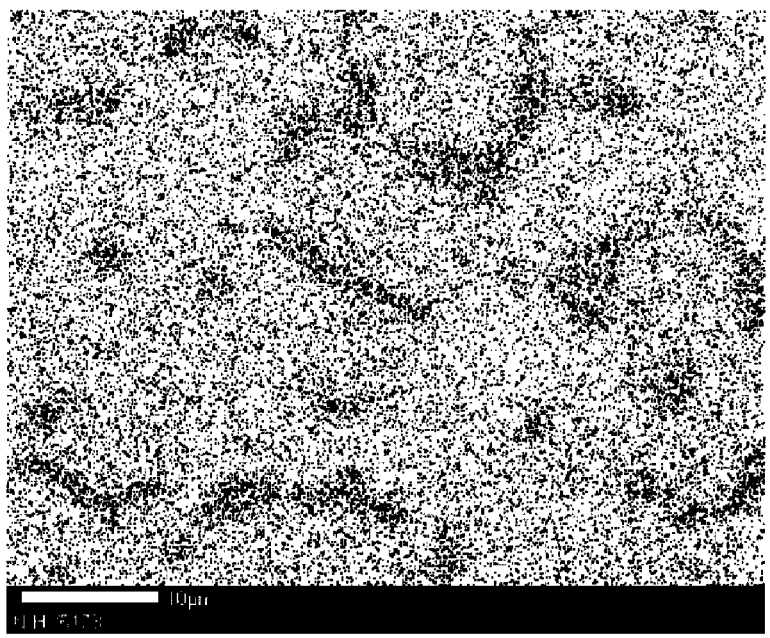
FIG. 4 is a nitrogen map of the polished cross section of FIG. 3. The dark regions indicate the presence of nitrogen.

FIG. 3 is a back-scattered electron image of a polished cross section of a PCA tube sintered under $N_2$ in a carbon-element furnace. FIG. 4 is a nitrogen map of the same polished cross section by electron microprobe analysis. The dark regions indicate the presence of nitrogen and clearly show the presence of a thin layer of a nitrogen-containing phase at the alumina grain boundaries.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A sintered translucent ceramic article comprised of polycrystalline alumina containing an amount of MgO and having a grain boundary phase containing aluminum, oxygen and nitrogen.

2. The ceramic article of claim 1 wherein the grain boundary phase is aluminum oxynitride.

3. The ceramic article of claim 1 wherein the amount of MgO in the polycrystalline alumina is from about 100 ppm to about 1000 ppm.

4. A ceramic discharge vessel comprising a ceramic body comprised of translucent polycrystalline alumina containing an amount of MgO and having a grain boundary phase containing aluminum, oxygen and nitrogen.

5. The ceramic discharge vessel of claim 4 wherein the grain boundary phase is aluminum oxynitride.

6. The ceramic discharge vessel claim 4 wherein the amount of MgO in the polycrystalline alumina is from about 100 ppm to about 1000 ppm.

7. The ceramic discharge vessel of claim 4 wherein the discharge vessel has a total transmittance of at least 95%.

* * * * *